United States Patent [19]
Kirby

[11] 3,963,465
[45] June 15, 1976

[54] GAS LINE LOOP WATER SEAL

[75] Inventor: Norman J. Kirby, Worth Township, Cook County, Ill.

[73] Assignee: United States Steel Corporation, Pittsburgh, Pa.

[22] Filed: Mar. 7, 1975

[21] Appl. No.: 556,512

[52] U.S. Cl. ................. 55/238; 55/355; 55/DIG. 41; 261/17; 261/79 A; 137/251; 266/145

[51] Int. Cl.² ............... B01D 47/06; F16K 9/00

[58] Field of Search ............. 55/220, 235, 236–238, 55/417, 432, 355, 274, DIG. 41, 428; 137/238, 240, 251, 252; 261/79 A, 17; 266/15

[56] References Cited
UNITED STATES PATENTS

| | | |
|---|---|---|
| 798,667 | 9/1905 | Doherty .......................... 55/355 |
| 1,304,884 | 5/1919 | Kawai ............................ 55/237 |
| 2,654,387 | 10/1953 | Innes ............................ 137/251 |
| 2,993,501 | 7/1961 | Nelissen ......................... 137/251 |
| 3,487,621 | 1/1970 | Bichet et al. .................. 55/237 X |
| 3,489,168 | 1/1970 | Joyce et al. .................... 137/252 |
| 3,513,870 | 5/1970 | Hirao ............................ 137/251 |

*Primary Examiner*—Frank W. Lutter
*Assistant Examiner*—David L. Lacey
*Attorney, Agent, or Firm*—R. C. Helm

[57] ABSTRACT

A gas line loop water seal has a water supply line connected to the entrance end of a vertical gas pipe loop, a vertical water discharge line with a drain seal at the exit end of the loop and a water drain line with a shut off valve connected from the bottom of the loop to the water discharge line. With the valve open, water washes the flowing gas. With the valve closed, water builds up in loop, seals the loop, and then the excess flows through the discharge line.

5 Claims, 3 Drawing Figures

U.S. Patent June 15, 1976 3,963,465
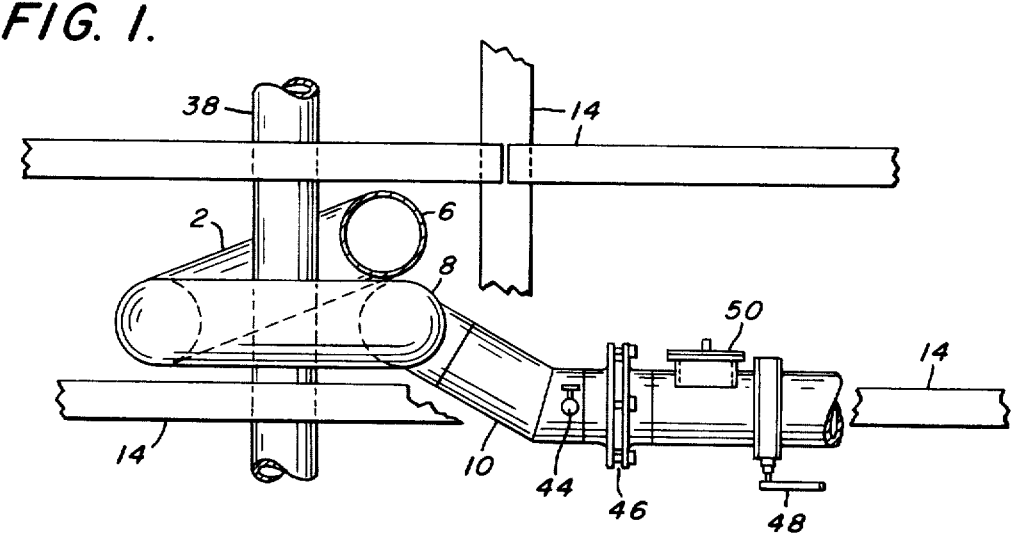
FIG. 1.
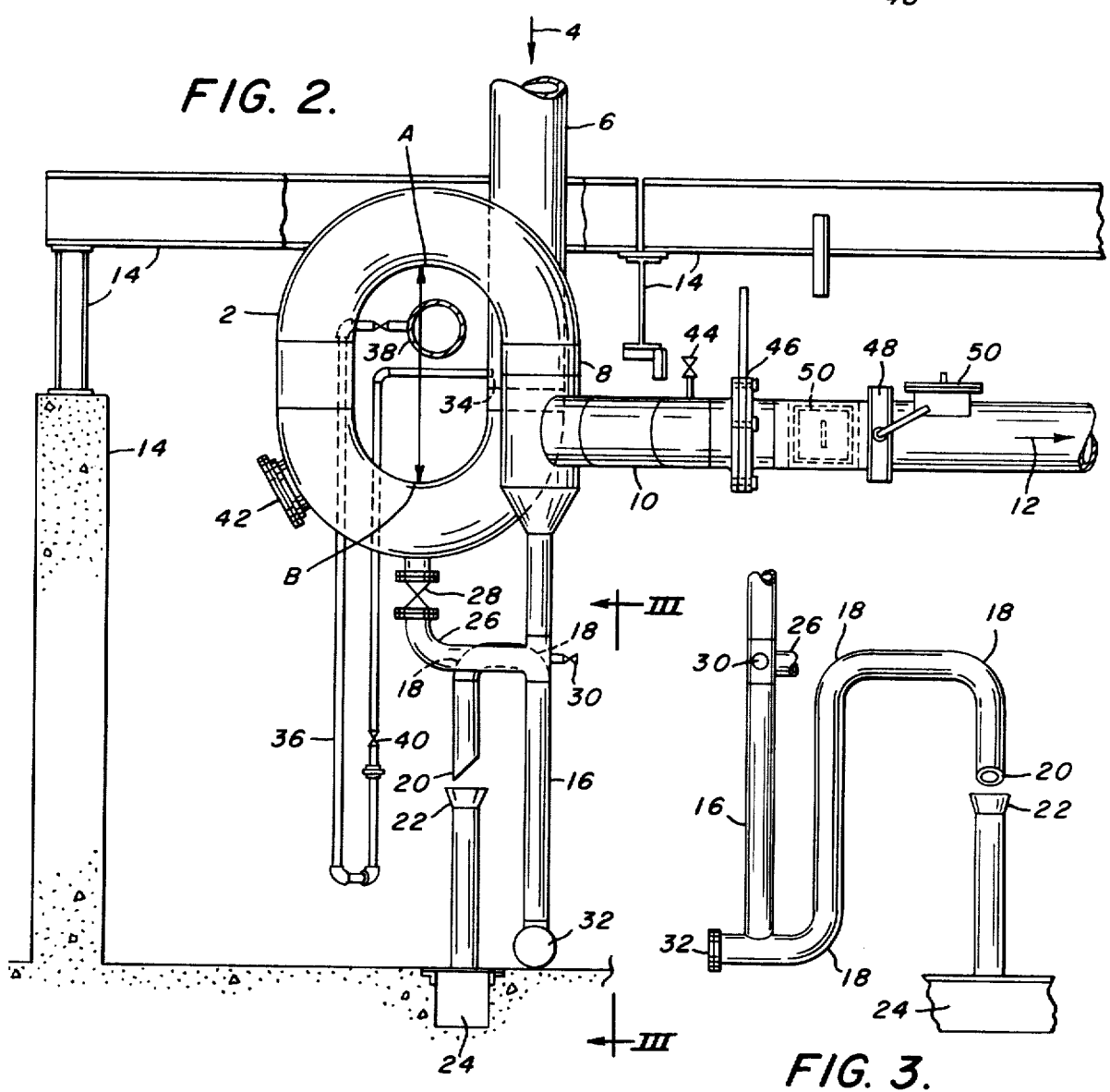
FIG. 2.
FIG. 3.

GAS LINE LOOP WATER SEAL

BACKGROUND OF THE INVENTION

This invention relates to a water seal for a gas line and more particularly to a water valve that provides a simple positive gas shut off in a large diameter gas line.

Blast furnace gas produced in the iron making process is generally distributed in a steel plant through a system of supply lines for use as a fuel in other equipment such as reheating furnaces. The distribution system includes control valves, conventional shut off valves, goggle valves and water seals depending upon the service requirements of the system and safety regulations. Typical installations include arrangements for washing dirt from the gas and disposing of the dirty wash water, such arrangements may also include a positive shut off of the line by providing for a water seal. Some such arrangements that I am aware of require a certain level of water be maintained in some type of sewer trap to be effective as well as safe. Others back up the potentially dirty water against conventional valves which may result in failure to provide a positive shut off and severe maintenance problems. With some other types of water seals there is no adequate method of determining if the seal is effective, and others are subject to failure by plugging from dirt.

In accordance with my invention, a gas supply line is connected to the entrance end of a vertical loop of a gas pipe. A water supply line is connected to supply water for either gas cleaning or sealing into the supply line at the entrance of the loop, and a water drain line is provided at the bottom of the loop. At the exit end of the loop, a horizontal gas discharge line conducts gas away from the loop and a vertical water discharge line conducts water from the loop through a drain seal and a collector to a sewer. The drain line is connected to the water discharge line through a dump valve. Water normally is sprayed into the entrance pipe to clean the gas. The water then passes through the drain line and water discharge line. To establish the seal, the dump valve is closed and water then builds up inside the loop, eventually spilling over the top of the loop, thereby creating the seal. Excess water then passes into the water discharge line.

It is therefore an object of my invention to provide a gas line loop water seal which provides a positive gas shut off, Another object is to provide a seal in which sealing water does not contact gas line valves.

Still another object is to provide a seal in which the operating parts are not subject to gas flow.

These and other objects will become more apparent after referring to the following specification and drawings in which:

FIG. 1 is a partial plan view of the loop seal of my invention,

FIG. 2 is a partial elevational view of the loop seal of my invention and

FIG. 3 is a partial elevational view along line III—III of FIG. 2 illustrating the drain seal of my invention.

Referring now to the drawings, reference numeral 2 refers to a vertically disposed loop of large diameter pipe, for example, twenty inch pipe, which is part of a blast furnace gas distribution system. Gas flows into the loop in the direction of arrow 4 through an entrance pipe 6 and out from the loop through an exit pipe 8. A generally horizontal outlet pipe 10 connects to exit pipe 8 conducting the gas in the direction of arrow 12 to gas using equipment such as a reheating furnace. The loop, the connecting pipes and other piping are supported in a conventional manner by structural members 14, only a portion of which are shown.

A water discharge line 16 is connected to exit pipe 8. Line 16 is curved at 18 to provide an S shaped drain seal. The discharge end 20 of line 16 directs the water flow into a collector 22 which is connected to drain into a sewer 24. A loop drain line 26 is connected from the low point of loop 2 to discharge line 16. A dump valve 28 is located in drain line 26. Water discharge line 16 also has a test valve 30 and a clean out 32.

A nozzle 34 admits water into loop 2 at entrance pipe 6 through a feed line 36 connected to a water supply header 38 and controlled by a valve 40. Loop 2 has a cleanout 42. Outlet pipe 10 has a test valve 44, a goggle valve 46, a control valve 48 and cleanouts 50.

During normal flow of gas through the loop, valve 40 is opened to provide sufficient water spray for gas cleaning purposes. Water drains out of the loop through drain line 26 and valve 28 which is opened, water discharge line 16 and into collector 22 to sewer 24. At the same time, gas flows around the loop and through outlet pipe 10 to the using facility through goggle valve 46 which is open and control valve 48 which is set for desired flow rate.

When it is desired to activate the water seal to stop the flow of gas, valve 28 is closed. Water will then accumulate in the loop until the water level rises to location A, thereby sealing the loop from further gas flow. Thereafter, continued water supply will result in a flow of water past location A, through exit pipe 8, discharge line 16 and into collector 22 to sewer 24.

This loop seal provides some very distinct advantages over other types of water seals. An overall height reduction may be accomplished, since the required height of the loop, the vertical distance between point A and point B, need only be sufficient for the water pressure to overcome the gas pressure by the desired safety factor. Goggle valve 46 and control valve 48 are both free of any water back up and therefore easier to clean, to maintain and to operate. Additional overflow arrangements have been eliminated. The tight closing of valve 28 is not critical because even if valve 28 leaks slightly, the seal will be maintained as long as there is sufficient water flowing through the loop. The operating area is convenient, valves 28 and 40 are very close to collector 22 which provide a visible check on water flow to determine operation of the seal. Test valves 30 and 44 are provided to test for gas or water flow. The water height of the drain seal in discharge line 16 should be sufficient to overcome the gas pressure by the desired safety factor.

I claim:

1. A gas line loop water seal comprising
a gas pipe having a vertically disposed loop which has a vertically disposed gas entrance pipe extending upward from the loop and a vertically disposed gas exit pipe extending downward from the loop,
means located on the gas entrance pipe for supplying water to the inside of the pipe loop whereby water may be introduced into the loop to fill the lower part of the loop to a level sufficient to seal the loop against the passage of gas,
a generally horizontal gas outlet pipe connected to the exit pipe and directed away from the loop for directing gas away from the gas line loop, a generally vertical water discharge line connected to the lower end of the exit pipe and extending downward away from the loop, a drain line connected to the bottom of the loop and to the water discharge line for draining water from the loop into the water discharge line, a valve in the drain line for controlling the flow of water from the loop and means in the water discharge line below the connection to the loop drain line for preventing the flow of gas through the water discharge line.

2. A gas line loop water seal according to claim 1 which further includes a collector connected to a sewer and in which the lower end of the water discharge line is disposed to discharge water into the collector.

3. A gas line loop water seal according to claim 2 in which the means for supplying water includes a water supply header, a nozzle mounted in the wall of the entrance pipe, a supply line connecting the water supply header to the nozzle and a control valve in the supply line.

4. A gas line loop water seal according to claim 3 in which the means for preventing the flow of gas through the water discharge line is an S shaped seal in the water discharge line.

5. A gas line loop water seal according to claim 4 which includes a first test valve connected to the outlet pipe for testing for fluid flow between the inside of the outlet pipe and the atmosphere and a second test valve connected to the water discharge line for testing for fluid flow between the inside of the water discharge line and the atmosphere.

\* \* \* \* \*